United States Patent
Duval et al.

(10) Patent No.: US 7,283,007 B2
(45) Date of Patent: Oct. 16, 2007

(54) ELECTRONIC CIRCUIT WITH MEANS OF EVALUATING ITS TEMPERATURE, METHOD FOR EVALUATING THE TEMPERATURE, AND APPLICATION

(75) Inventors: Benjamin Duval, Saint Maximin (FR); Alain Pomet, Rousset (FR)

(73) Assignee: STMicroelectronics SA, Montrouge (FR)

( * ) Notice: Subject to any disclaimer, the term of this patent is extended or adjusted under 35 U.S.C. 154(b) by 68 days.

(21) Appl. No.: 11/202,392

(22) Filed: Aug. 11, 2005

(65) Prior Publication Data

US 2006/0038626 A1  Feb. 23, 2006

(30) Foreign Application Priority Data

Aug. 12, 2004  (FR) .................... 04 08853

(51) Int. Cl.
   *H03L 1/00*  (2006.01)
(52) U.S. Cl. ..................... 331/176; 331/158
(58) Field of Classification Search ........... 331/176, 331/158
   See application file for complete search history.

(56) References Cited

U.S. PATENT DOCUMENTS

| 3,879,992 A | * | 4/1975 | Bartera ............... 73/24.01 |
| 4,325,036 A | * | 4/1982 | Kuwabara ............ 331/176 |
| 5,200,714 A | * | 4/1993 | Hayashi ............... 331/66 |
| 5,795,068 A |   | 8/1998 | Conn, Jr. |
| 2004/0134992 A1 | * | 7/2004 | Guez et al. .......... 235/492 |
| 2005/0012561 A1 | * | 1/2005 | Young et al. ........ 331/176 |

FOREIGN PATENT DOCUMENTS

| DE | 101 14 825 | 10/2002 |
| FR | 2.032.336 | 11/1970 |
| WO | WO99/61873 | 12/1999 |

OTHER PUBLICATIONS

French Preliminary Search Report for French Application 0408853, dated Jan. 14, 2005.

* cited by examiner

*Primary Examiner*—Joseph Chang
(74) *Attorney, Agent, or Firm*—Lisa K. Jorgenson; Jose Gutman; Fleit Kain Gibbons Gutman Bongini & Bianco P.L.

(57) ABSTRACT

An electronic circuit (CE) is provided with an oscillator (OSC_1) outputting a signal (S1) with a frequency (F1) varying as a function of the temperature (Tc) of this circuit, and receiving or outputting a signal (S2) with a fixed and known frequency (F2). This circuit includes a measurement module (MSR) outputting a measurement signal ($\Phi 1$) representative of the variable frequency (F1) evaluated using the fixed frequency signal (S2) used as a reference or standard, and a conversion module (CVRS) applying a transfer function ($u^{-1}$, $v^{-1}$, or $w^{-1}$) that is the inverse of the function for the variation of the frequency of the first signal (S1) as a function of the temperature, to the measurement signal ($\Phi 1$), in order to output a signal ($\Phi c$) representative of the circuit temperature (Tc).

16 Claims, 1 Drawing Sheet

ELECTRONIC CIRCUIT WITH MEANS OF EVALUATING ITS TEMPERATURE, METHOD FOR EVALUATING THE TEMPERATURE, AND APPLICATION

CROSS-REFERENCE TO RELATED APPLICATION

This application is based upon and claims priority from prior French Patent Application No. 04 08853, filed on Aug. 12, 2004, the entire disclosure of which is herein incorporated by reference.

BACKGROUND OF THE INVENTION

1. Field of the Invention

The invention relates in general to techniques for in-situ evaluation of the temperature of an electronic circuit.

More precisely, according to a first of its aspects, the invention relates to an electronic circuit provided with an oscillator outputting a first signal during operation oscillating at a first variable frequency, varying as a function of the temperature of the circuit in accordance with a determined monotonic function, this circuit having a second signal during operation oscillating at a second known frequency independent of the temperature.

2. Description of the Related Art

It may be crucial to detect the temperature of an electronic circuit, because the physical integrity and correct operation of such a circuit can only be guaranteed within a given temperature range, and outside this range the circuit can produce aberrant results even in the best cases, possibly with serious consequences.

It is known that temperature sensors can be used on some electronic circuits to overcome these difficulties.

Nevertheless, this not only makes it necessary to significantly increase the size of the circuit so that the temperature sensor can be integrated into it, but it is also relatively difficult to verify the response of this sensor.

Accordingly, there exists a need for overcoming the disadvantages of the prior art as discussed above.

SUMMARY OF THE INVENTION

The purpose of this invention that is in this context is to suggest a technique for eliminating these constraints.

This is achieved because an exemplary circuit according to the invention, which is otherwise conforming with the generic definition given above, is characterized essentially in that it comprises a measurement module receiving the first and second oscillating signals and outputting a measurement signal for the first frequency obtained by evaluating the first frequency based on the second oscillating signal used as a reference or standard, and a conversion module receiving the measurement signal and producing an output signal representative of the circuit temperature, derived by applying a transfer function that is the inverse of the monotonic function, to the measurement signal.

In this case, the term "module" should be understood in the broadest functional sense because those skilled in the art will understand that such a module can be used in hardware form as a portion of the circuit or in software form for a circuit provided with an arithmetic and logical system unit, or even in hybrid form.

In its preferred application, the electronic circuit according to the invention comprises a smart card suitable for a communication to the USB standard.

As those skilled in the art know, the abbreviation USB (Universal Serial Bus) refers to a very widespread standard used in the world of microcomputers.

The second oscillating circuit can be produced using a second oscillator provided on the electronic circuit itself.

The first and second frequencies can advantageously be of the same order of magnitude, and for example equal, for a determined operating temperature of the circuit.

According to a second of its aspects, the invention relates to a method for evaluating the temperature of an electronic circuit that during operation produces a first signal oscillating at a first frequency varying as a function of the temperature of the circuit according to a determined monotonic function, this circuit producing a second signal oscillating at a second known frequency practically independent of the temperature, or being able to use this signal during operation, this method being characterized in that it comprises a first phase consisting of generating a measurement signal of the first frequency by measuring the first frequency using the second oscillating signal, and a second phase consisting of generating an output signal representative of the circuit temperature by determining the temperature to which the measurement signal corresponds, using the monotonic function.

For example, the first frequency measurement signal may be generated at least by counting the number of oscillations that the first oscillating signal produces during a time defined by the occurrence of a predetermined number of oscillations of the second oscillating signal.

However, the first frequency measurement signal can also be produced at least by counting the number of oscillations produced by the second oscillating signal during a time period defined by the occurrence of a predetermined number of oscillations of the first oscillating signal.

The invention is advantageously applicable to the case in which the electronic circuit for which the temperature is to be evaluated comprises a smart card.

In this case, since the operational reliability of such a smart card is a very strong constraint, the signal representative of its temperature can be used to take any necessary countermeasures that might influence its operation mode, or possibly even prohibit operation when a limiting operating temperature occurs.

BRIEF DESCRIPTION OF THE DRAWINGS

Other characteristics and advantages of the invention will become clear after reading the following description that is given for guidance and is in no way limitative, with reference to the attached drawings in which.

DETAILED DESCRIPTION

As mentioned above, the invention relates particularly to an electronic circuit CE for which the temperature Tc must be determined.

According to one typical application of the invention, this electronic circuit forms a smart card suitable for data communication to the USB standard.

Figure 1:
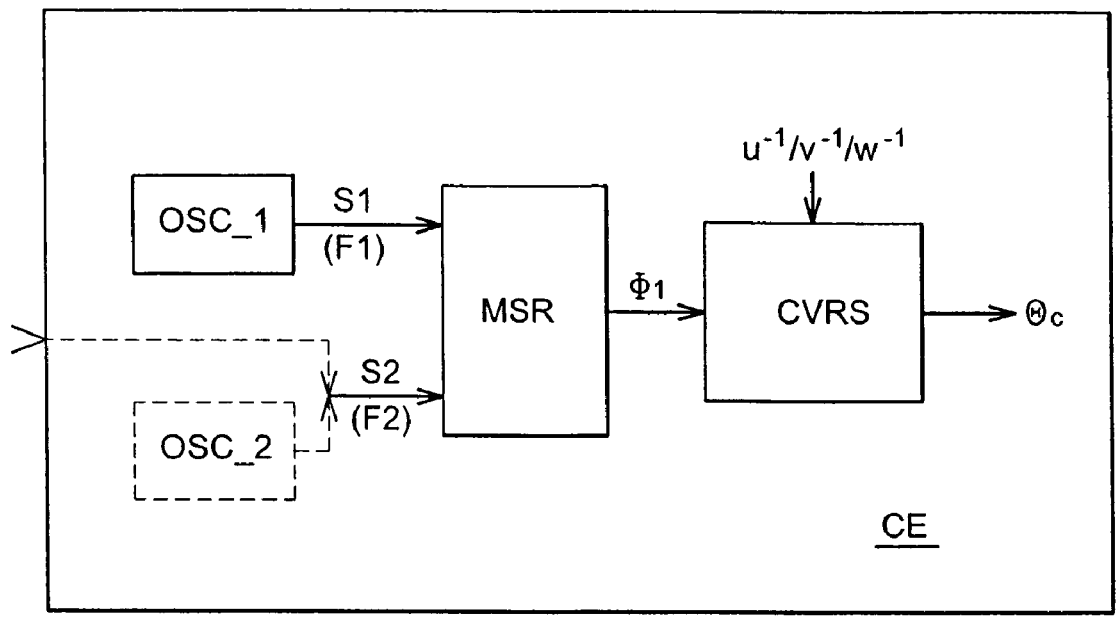
FIG. 1 shows a partial and functional diagram of a circuit according to the invention.
Figure 2:
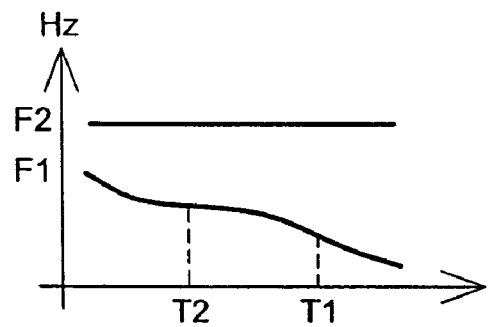
FIG. 2 shows the values of the first and second frequencies, as a function of the temperature.
Figure 3A:
FIGS. 3A and 3B show the time diagrams for the first and second frequencies respectively, for a first circuit temperature T1.
Figure 3B:
Figure 4A:
FIGS. 4A and 4B show the time diagrams for the first and second frequencies respectively, for a second circuit temperature T2.
Figure 4B:

This circuit CE is provided with an oscillator OSC_A that outputs an oscillating signal S1 during operation for which the frequency F1 varies as a function of the temperature Tc of the circuit following a monotonic function, for example like that shown in FIG. 2.

This circuit CE also uses a second oscillating signal S2 during operation, for example produced by an oscillator OSC_2 implanted on this circuit, and for which the frequency F2 is known and practically independent of the temperature Tc.

Provided that the frequency F2 is fixed and known, and therefore can be treated like a constant, the equation relating the frequency F1 to the temperature Tc can be written in different forms, such as:

$$F1 \approx u(Tc),$$

$$F1 \approx F2 * v(Tc), \text{ or}$$

$$F1 \approx F2 * [1 + w(Tc)],$$

where u, v and w are monotonic functions.

The circuit CE according to the invention comprises a measurement module MSR and a conversion module CVRS that, in combination, produce a signal $\Phi c$ representative of the temperature Tc of this circuit.

To achieve this, the measurement module MSR receives the two oscillating signals S1 and S2 in a first phase and evaluates the frequency F1 of the variable frequency signal S1 using the fixed frequency oscillating signal S2 used as a reference or standard.

For example, the module MSR counts the number n of oscillations that the variable frequency signal S1 produces during a time period defined by the occurrence of a predetermined number m of oscillations of the fixed frequency signal S2.

However, the module MSR can also count the number m of oscillations that the fixed frequency signal S2 produces during a time period defined by the occurrence of a predetermined number n of oscillations of the variable frequency signal S1.

At the end of its processing, the measurement module MSR outputs a measurement signal $\Phi 1$ generated so as to be representative of the frequency F1 of the signal S1.

For example, the module MSR could output a signal $\Phi 1$ in the two embodiments mentioned above, such that:

$$\Phi 1 = (n/m) * F2$$

Then, in a second phase, the conversion module CVRS receives the measurement signal $\Phi 1$ and produces the output signal $\Phi c$ representative of the temperature Tc of the circuit, using the monotonic equation such as u, v or w to determine the temperature corresponding to the measurement signal $\Phi 1$.

In other words, the conversion module CVRS produces the signal $\Phi c$ derived by applying a transfer function such as $u^{-1}$, $v^{-1}$, or $w^{-1}$, that is the inverse of the monotonic function u, v or w, to the measurement signal $\Phi 1$.

For example, if the measurement signal $\Phi 1$ is generated by the measurement module MSR so that it is equal to:

$$\Phi 1 = (n/m) * F2,$$

then the output signal $\Phi c$ is generated by the module CVRS to be equal to:

$$\Phi c = u^{-1}(\Phi 1),$$

where $u^{-1}$ is the inverse function of the function u defined above.

If the measurement signal $\Phi 1$ is generated by the measurement module MSR to be equal to:

$$\Phi 1 = (n/m),$$

then the output signal $\Phi c$ is generated by the module CVRS to be equal to:

$$\Phi c = v^{-1}(\Phi 1),$$

where $v^{-1}$ is the inverse function of the function v defined above.

If the measurement signal $\Phi 1$ is generated by the measurement module MSR to be equal to:

$$\Phi 1 = (n-m)/m,$$

then the output signal $\Phi c$ is generated by the module CVRS to be equal to:

$$\Phi c = w^{-1}(\Phi 1),$$

where $w^{-1}$ is the inverse function of the function w defined above.

The representation form that uses the w and $w^{-1}$ functions is particularly advantageous if there is a possible operating temperature To of the circuit CE at which the frequencies F1 and F2 are equal.

According to one of its preferred applications, the invention can be used so that the temperature Tc of a circuit CE forming a smart card can be evaluated.

In this case, the output signal $\Phi c$ representative of the temperature Tc may advantageously be used to influence the operating mode of this smart card, for example to put it out of service if its temperature is too high.

While there has been illustrated and described what is presently considered to be embodiments of the present invention, it will be understood by those of ordinary skill in the art that various other modifications may be made, and equivalents may be substituted, without departing from the true scope of the present invention.

Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. An electronic circuit comprising:
an oscillator for outputting a first signal during operation oscillating at a first variable frequency varying as a function of the temperature of the electronic circuit in accordance with a determined monotonic function, this electronic circuit having a second signal during operation oscillating at a second known frequency practically independent of the temperature;
a measurement module for receiving the first and second oscillating signals and outputting a measurement signal for the first frequency, obtained by evaluating the first frequency using the second oscillating signal used as a reference or standard; and
a conversion module for receiving the measurement signal and producing an output signal representative of the electronic circuit temperature, derived by applying a transfer function that is the inverse of the monotonic function to the measurement signal, and wherein the electronic circuit comprises at least a part of a smart card suitable for communication according to the USB standard.

2. The electronic circuit according to claim 1, wherein the first and second frequencies are equal for a determined operating temperature of the circuit.

3. The electronic circuit according to claim 1, comprising a second oscillator that outputs the second oscillating signal.

4. The electronic circuit according to claim 3, wherein the first and second frequencies are equal for a determined operating temperature of the electronic circuit.

5. A method for evaluating the temperature of an electronic circuit that during operation produces a first signal oscillating at a first frequency varying as a function of the temperature of the circuit according to a determined monotonic function, this electronic circuit producing a second signal oscillating at a second known frequency practically independent of the temperature, the method comprising:

generating a measurement signal of the first frequency by measuring the first frequency of the first signal using the second signal oscillating at the second known frequency practically independent of the temperature; and generating an output signal representative of the temperature of the circuit by determining the temperature to which the measurement signal corresponds, derived by applying a transfer function that is the inverse of the monotonic function to the measurement signal, this method being applied to an electronic circuit forming at least a part of a smart card suitable for communication according to the USB standard.

6. The method according to claim 5, wherein the measurement signal of the first frequency is generated at least by counting the number of oscillations that the first oscillating signal produces during a time period defined by the occurrence of a predetermined number of oscillations of the second oscillating signal.

7. The method according to claim 5, wherein the measurement signal of the first frequency is generated at least by counting the number of oscillations produced by the second oscillating signal during a time period defined by the occurrence of a predetermined number of oscillations of the first oscillating signal.

8. The method according to claim 5, wherein the method for evaluating the temperature of the smart card.

9. The method according to claim 8, wherein the output signal representative of the temperature of the smart card is used to influence an operating mode of the smart card.

10. The method according to claim 8, wherein the output signal representative of the temperature of the smart card is used to put the smart card out of service if its temperature is too high.

11. A smart card comprising:

an electronic circuit including:

an oscillator for outputting a first signal during operation oscillating at a first variable frequency varying as a function of the temperature of the electronic circuit in accordance with a determined monotonic function; and a second oscillator for outputting a second signal during operation oscillating at a second known frequency practically independent of the temperature; and a measurement module for receiving the first and second oscillating signals and outputting a measurement signal for the first frequency, obtained by evaluating the first frequency using the second oscillating signal used as a reference or standard; and a conversion module for receiving the measurement signal and producing an output signal representative of the temperature of the electronic circuit, derived by applying a transfer function that is the inverse of the monotonic function to the measurement signal.

12. The smart card of claim 11, wherein:

the output signal produced by the conversion module is representative of the temperature of the smart card.

13. The smart card of claim 12, wherein:

the smart card uses the output signal produced by the conversion module to influence an operating mode of the smart card.

14. The smart card of claim 12, wherein:

the smart card uses the output signal produced by the conversion module to put the smart card out of service if its temperature is too high.

15. The smart card of claim 11, wherein:

the measurement module generates the measurement signal of the first frequency at least by counting the number of oscillations that the first oscillating signal produces during a time period defined by the occurrence of a predetermined number of oscillations of the second oscillating signal.

16. The smart card of claim 11, wherein:

the measurement module generates the measurement signal of the first frequency at least by counting the number of oscillations produced by the second oscillating signal during a time period defined by the occurrence of a predetermined number of oscillations of the first oscillating signal.

* * * * *